US011501105B2

(12) United States Patent
Kangaspunta et al.

(10) Patent No.: US 11,501,105 B2
(45) Date of Patent: Nov. 15, 2022

(54) AUTOMATIC CREATION AND UPDATING OF MAPS

(71) Applicant: Zoox, Inc., Menlo Park, CA (US)

(72) Inventors: Juhana Kangaspunta, San Francisco, CA (US); Kai Zhenyu Wang, Foster City, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 1294 days.

(21) Appl. No.: 15/910,758

(22) Filed: Mar. 2, 2018

(65) Prior Publication Data
US 2019/0272446 A1    Sep. 5, 2019

(51) Int. Cl.
| G06K 9/62 | (2022.01) |
| G01C 21/32 | (2006.01) |
| G05D 1/02 | (2020.01) |
| G06T 7/10 | (2017.01) |
| G06F 16/29 | (2019.01) |

(52) U.S. Cl.
CPC ........... G06K 9/6256 (2013.01); G01C 21/32 (2013.01); G05D 1/0212 (2013.01); G06F 16/29 (2019.01); G06T 7/10 (2017.01); *G06T 2207/20084* (2013.01); *G06T 2207/30252* (2013.01)

(58) Field of Classification Search
CPC .... G06K 9/6256; G06K 9/6267; G01C 21/32; G05D 1/0212; G06F 16/29; G06T 7/10; G06T 2207/20084; G06T 2207/30252; G06T 2207/20081; G06T 2207/30256;
(Continued)

(56) References Cited

U.S. PATENT DOCUMENTS 9,495,874 B1   11/2016 Zhu et al.
10,229,322 B2 *  3/2019 Fridental ............. G06F 16/5854
(Continued)

FOREIGN PATENT DOCUMENTS

| CN | 107749948 | * | 3/2018 | ......... H04N 5/23212 |
| CN | 112561053 | * | 3/2021 | ............... G06N 3/08 |

(Continued)

OTHER PUBLICATIONS

PCT Search Report and Written Opinion dated May 23, 2019, for PCT Application No. PCT/US2019/017940, 8 pages.

*Primary Examiner* — Jerome Grant, II
(74) *Attorney, Agent, or Firm* — Lee & Hayes, P.C.

(57) ABSTRACT

A system may automatically create training datasets for training a segmentation model to recognize features such as lanes on a road. The system may receive sensor data representative of a portion of an environment and map data from a map data store including existing map data for the portion of the environment that includes features present in that portion of the environment. The system may project or overlay the features onto the sensor data to create training datasets for training the segmentation model, which may be a neural network. The training datasets may be communicated to the segmentation model to train the segmentation model to segment data associated with similar features present in different sensor data. The trained segmentation model may be used to update the map data store, and may be used to segment sensor data obtained from other portions of the environment, such as portions not previously mapped.

20 Claims, 6 Drawing Sheets

(58) Field of Classification Search
CPC .......... G06T 7/11; G06T 7/174; G06V 10/82; G06V 20/588
USPC ......................................................... 706/20
See application file for complete search history.

(56) References Cited

U.S. PATENT DOCUMENTS

| | | | |
|---|---|---|---|
| 10,496,099 B2 * | 12/2019 | Wilkinson | ........... G05D 1/0223 |
| 11,120,353 B2 * | 9/2021 | Olabiyi | ............. B60W 50/0097 |
| 2017/0307735 A1 * | 10/2017 | Rohani | .................... G01S 17/89 |
| 2018/0053108 A1 | 2/2018 | Olabiyi et al. | |
| 2019/0246324 A1 * | 8/2019 | Cizdziel | ................ H04W 36/06 |

FOREIGN PATENT DOCUMENTS

| | | | | |
|---|---|---|---|---|
| EP | 2993618 | * | 8/2015 | ............... G06K 9/00 |
| JP | 2016024598 | * | 2/2016 | |
| KR | 10-2022-0014805 | * | 2/2022 | ............... G06N 3/08 |

\* cited by examiner

600 ⤵

```
┌─────────────────────────────────────────────────────────────────┐
│ RECEIVE THIRD SENSOR DATA REPRESENTING A THIRD PORTION OF AN    │
│                          ENVIRONMENT                             │
│                              602                                 │
└─────────────────────────────────────────────────────────────────┘
                                ↓
┌─────────────────────────────────────────────────────────────────┐
│ RECEIVE THIRD MAP DATA FROM THE UPDATED MAP DATA STORE, THE     │
│ THIRD MAP DATA CORRESPONDING TO THE THIRD PORTION OF THE         │
│                          ENVIRONMENT                             │
│                              604                                 │
└─────────────────────────────────────────────────────────────────┘
                                ↓
┌─────────────────────────────────────────────────────────────────┐
│ ASSOCIATE ONE OR MORE OF THE THIRD FEATURES WITH THE THIRD      │
│         SENSOR DATA TO CREATE SECOND TRAINING DATA              │
│                              606                                 │
└─────────────────────────────────────────────────────────────────┘
                                ↓
┌─────────────────────────────────────────────────────────────────┐
│ COMMUNICATE THE SECOND TRAINING DATA TO THE TRAINED             │
│                   SEGMENTATION MODEL                             │
│                              608                                 │
└─────────────────────────────────────────────────────────────────┘
                                ↓
┌─────────────────────────────────────────────────────────────────┐
│ FURTHER TRAIN THE TRAINED SEGMENTATION MODEL BASED AT LEAST IN  │
│              PART ON THE SECOND TRAINING DATA                    │
│                              610                                 │
└─────────────────────────────────────────────────────────────────┘
                                ↓
┌─────────────────────────────────────────────────────────────────┐
│ DETERMINE ONE OR MORE OF A POSITION OR AN ORIENTATION OF A      │
│ VEHICLE BASED AT LEAST IN PART ON UPDATED MAP DATA FROM THE     │
│                   UPDATED MAP DATA STORE                         │
│                              612                                 │
└─────────────────────────────────────────────────────────────────┘
                                ↓
┌─────────────────────────────────────────────────────────────────┐
│ GENERATE BASED AT LEAST IN PART ON THE ONE OR MORE OF THE       │
│ POSITION OR THE ORIENTATION OF THE VEHICLE, ONE OR MORE         │
│           TRAJECTORIES FOR MANEUVERING THE VEHICLE              │
│                              614                                 │
└─────────────────────────────────────────────────────────────────┘
                                ↓
┌─────────────────────────────────────────────────────────────────┐
│ MANEUVER THE VEHICLE BASED AT LEAST IN PART ON THE ONE OR MORE  │
│                         TRAJECTORIES                             │
│                              616                                 │
└─────────────────────────────────────────────────────────────────┘
```

FIG. 6

AUTOMATIC CREATION AND UPDATING OF MAPS

BACKGROUND

Maps, such as digital two- and three-dimensional maps, have numerous uses. For example, autonomous vehicles may use maps to determine the position and/or orientation of the vehicle and/or to travel between geographic locations. Some such maps may be created based at least partially on data obtained from sensors that pass through and detect objects in the environment, such as, for example, buildings, roads, traffic signs and signals, other vehicles, pedestrians, cyclists, vegetation, etc. For example, imagers may be used to generate image data, which may be segmented to classify some objects in the image data using image segmentation techniques. However, some features may be particularly difficult to segment and classify, and manually creating training data to train segmentation networks for segmenting such features may be impracticable due, for example, to the extremely large amount of data that may need to be labeled by hand to train such segmentation networks. Further, data associated with some features in the environment may still be extremely difficult to segment and classify, regardless of the amount of manually labeled training data. Thus, it may still be necessary to manually add some features to the maps. In addition, it may be difficult to manually create training data for different environmental conditions. The manual creation of such data may consume large amounts computer processing and memory capacity.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 6 is a flow diagram of an example process for creating additional training data, training a segmentation model using the created additional training data, and using segmented data to determine a vehicle pose, generate trajectories, and/or maneuver the vehicle based at least in part on one or more of the trajectories.

DETAILED DESCRIPTION

Figure 1:
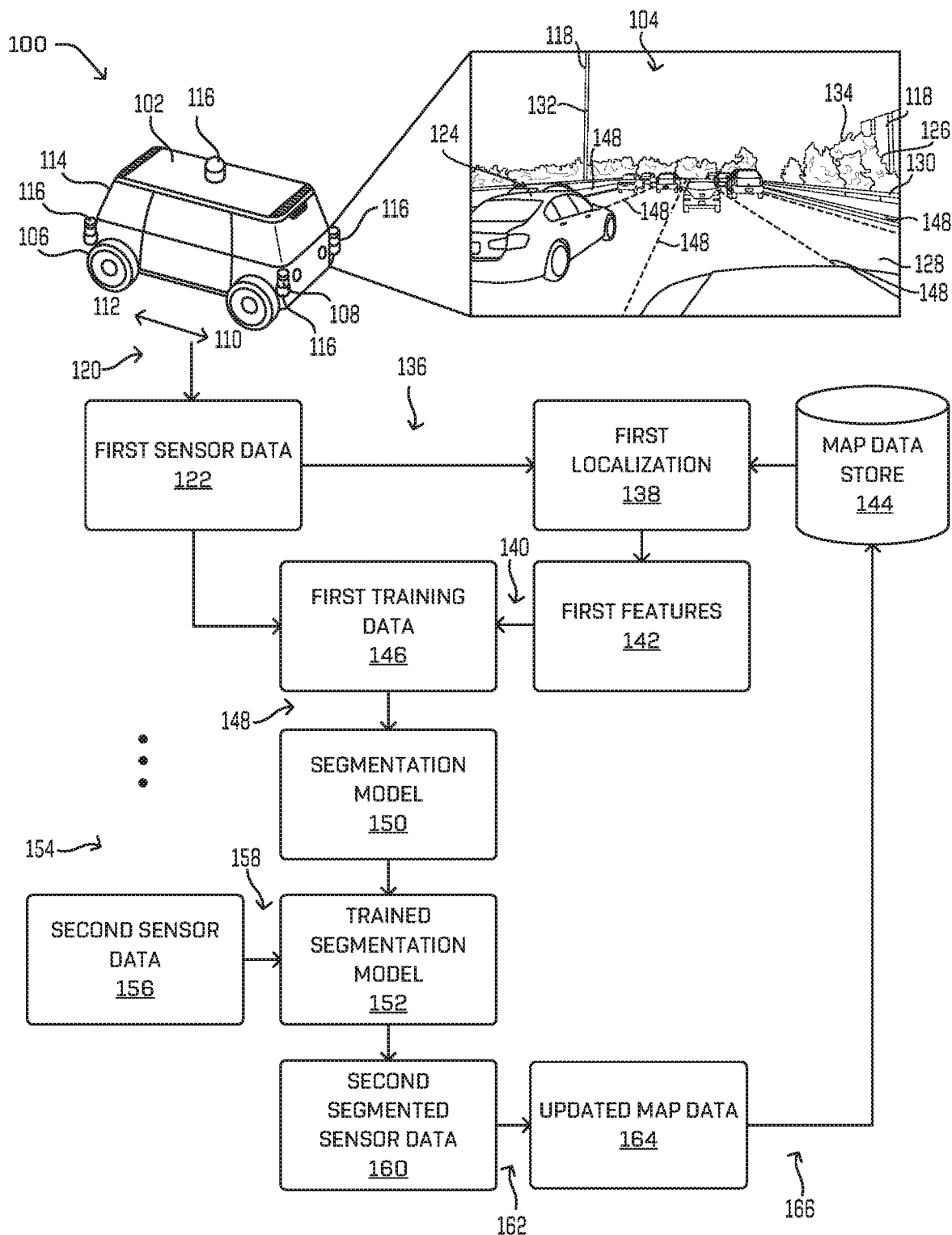
FIG. 1 is a pictorial flow diagram of an example process for creating training data and using the training data to train and use an example segmentation model.

As discussed above, conventional techniques for creating three-dimensional maps for autonomous vehicle navigation can be time consuming and labor intensive due, for example, to the time required to manually label features in the three-dimensional maps. This disclosure is generally directed to methods, apparatuses, and systems for automatically creating (e.g., creating with little or no manual human labeling) training data for training machine learning networks to segment and/or classify sensor-generated data representing the environment. The output of such machine learning networks may be used to automatically generate three-dimensional maps for unmapped sections of the world. The three-dimensional maps generated according to the techniques described herein may include additional information, such as semantic labels of objects and features. By way of example and not limitation, the semantic labels may identify lanes, lane boundaries, curves, intersections, traffic signs, traffic signals, crosswalks, sidewalks, medians, traffic islands, traffic circles, or any other features or objects that may be useful in localization (e.g., determining the vehicle's current location in the three-dimensional map), perception (e.g., recognizing objects, features, and road geometry in the vehicle's surroundings), and/or planning one or more trajectories of the vehicle as it traverses a route.

In some examples, sensor data may be generated as one or more sensors pass through a portion of the environment. Features present in the portion of the environment present in existing map data may be projected onto the sensor data to create a training dataset, which may be used to train a segmentation model to automatically segment and classify (e.g., with little or no manual human additions) sensor-generated data including data associated with similar or identical features from a different portion of the environment. In some examples, the automatically segmented and classified data may be used to update a map data store to include the data associated with the different portion of the environment. As a non-limiting example, which will be described in more detail below, lane indicators may be projected from a map having lane data into image data from cameras to create training data for a machine learned model for segmenting image data into lanes. Such a model may, in turn, be used to detect lanes and update the map of lane data for regions that have not yet been mapped.

In some examples, this additional data may be used to create additional training data, such that when one or more sensors pass through the different portion of the environment and generate sensor data representing features in the different portion of the environment, features from the additional data from the map data store may be overlaid or projected onto the sensor data to create additional training data for further training of the segmentation model. In this example manner, training data may be automatically created, segmentation models may be automatically trained using the training data, existing map data in a map data store may be automatically updated, map data associated with previously unmapped portions of the environment may be automatically added to the map data store, additional training data may be automatically created using the updated map data store, and/or the additional training data may be used to further train the segmentation model, and so on. In some examples, the training data and/or map generation may be performed online (e.g., aboard a vehicle) and/or offline (e.g., at location remote from the vehicle, such as, for example, at a remote computing resource or teleoperations office).

At least some of the above-noted examples may result in improved segmentation models that may be used more efficiently by autonomous vehicles and/or associated systems, thereby reducing computer processor capacity requirements and/or memory requirements. For example, some examples may reduce the time and/or the number of processor cycles to localize a vehicle relative to a map. This, in turn, may result in improved operation of autonomous vehicles using the segmentation models and maps, for example, such that determinations based at least in part on sensor data and/or map data may be more quickly calculated, which may result in improved control of vehicles that use the map data. In addition, automatically updating maps to included more data for portions of the environment already mapped, as well as previously unmapped portions of the environment, may result in more complete maps that may be more efficiently created and used. In some examples, segmentation models trained with the automatically generated training data may be capable of segmenting and classifying sensor data received from sensors, regardless of the environmental conditions in which the sensor data was generated. For example, automatically creating training data according to some examples herein may facilitate creation of the training data while passing the sensors through the environment under different environmental conditions, thereby generating sensor data under those conditions. The sensor data generated under those conditions may be segmented and the map data corresponding to the environment through which the sensors passed during those conditions may be overlaid onto the sensor data, thereby providing training data consistent with those conditions. This may result in providing data for more reliable and environmentally independent operation of autonomous vehicles and/or other devices that use the segmented and classified data. In some examples, this may result in additional efficiencies in the use of computing capacity and/or computing memory.

This disclosure is generally directed to a system configured to receive first sensor data representing a first portion of an environment, and receive first map data (e.g., from a map data store). The first map data may correspond to the first portion of the environment and may include data representative of one or more features present in the first portion of the environment. For example, the system may be configured to determine a pose (e.g., a global or local pose) associated with the first sensor data based at least in part on the first sensor data. The system may be configured to determine the first map data from the map data store that corresponds to the first portion of the environment based at least in part on the pose associated with the first sensor data. In some examples, the system may also be configured to associate one or more of the first features with the first sensor data to create first training data. For example, the system may be configured to project or overlay the one or more first features onto the first sensor data to create (e.g., automatically with little or no human additions) first training data. The system may also be configured to communicate the first training dataset to a segmentation model configured to receive sensor data representing the environment and segment the sensor data to classify one or more features in the environment according to a plurality of classifications. In some examples, the segmentation model may be a machine learning network, such as neural network. The system may further be configured to train the segmentation model based at least in part on using the first training dataset as ground truth to create a trained segmentation model.

In some examples, the system may also be configured to receive second sensor data representing a second portion of an environment, and communicate the second sensor data to the trained segmentation model to segment the second sensor data to classify one or more second features in the second portion of the environment according to the plurality of classifications to create segmented second sensor data. In some examples, the second portion of the environment may include a portion of the environment that has not previously been mapped and/or may include map data not previously present in the map data store. In some examples, the system may also be configured to communicate the segmented second sensor data to the map data store, and update the map data store to create an updated map store based at least in part on the segmented second sensor data. In some examples, updating the map data store may include validating existing map data and/or supplementing existing map data with map data associated with locations in the environment not previously mapped.

The system, in some examples, may also be configured to determine one or more of a position or an orientation of a vehicle based at least in part on updated map data from the updated map data store. The system, in some examples, may be configured to generate, based on the one or more of the position or the orientation of the vehicle, one or more trajectories for maneuvering the vehicle, and maneuver the vehicle based at least in part on the one or more trajectories.

In some examples of the system, receiving the first sensor data may include receiving the first sensor data from one or more of one or more imagers (e.g., cameras), one or more light detection and ranging (LIDAR) sensors, one or more radio detection and ranging (RADAR) sensors, or one or more sound navigation and ranging (SONAR) sensors. In some such examples, the segmentation model may be configured to segment data generated by one or more such sensor types. In some examples, the first sensor data may be generated by a single sensor or sensor type, and in some examples, the first sensor data may be generated by more than a single sensor and/or more than a single sensor type and fused to create the first sensor data.

In some examples, the data representative of one or more features present in one or more of the first, second, and/or third portions of the environment may include data representative of one or more of road features that may include one or more of lanes, lane markings (e.g., solid or dashed white and/or yellow lines), road markings, road indications, light poles, utility poles, bridge supports, buildings, manhole covers, curves, intersections, traffic signs, traffic signals, crosswalks, sidewalks, medians, traffic islands, traffic circles, etc. For example, the one or more features may include one or more lanes of a road, such as, for example, two lanes, three lanes, four lanes, five lanes, entrance lanes, or exit lanes.

In some examples of the system, the first sensor data may include data representative of multiple different environmental conditions. For example, receiving the first sensor data may include receiving the first sensor data including data representative of one or more environmental conditions including, for example, one or more of a clear condition, a sunny condition, a foggy condition, a rainy condition, a snowy condition, during daytime, or during nighttime. This may result in creating training datasets that are effective for training a segmentation model to segment and/or classify features in sensor data regardless of the environmental conditions.

The techniques and systems described herein may be implemented in a number of ways. Example implementations are provided below with reference to the figures.

FIG. 1 is a pictorial flow diagram of an example process 100 for creating an example training dataset and training an example segmentation model using the created training dataset. For example, the process 100 may automatically create training datasets (e.g., create the training datasets with little or no human manual additions), and the automatically train the segmentation model using the automatically created training datasets. The example process 100 shown also updates an example map with updated map data created (e.g., automatically created) by the trained segmentation model.

In the example shown, an example vehicle 102 travels through the environment 104. The vehicle 102 may be may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 106, the systems and methods described herein may be incorporated into vehicles having fewer or a greater number of wheels, tires, and/or tracks. The example vehicle 102 may have four-wheel steering and may operate generally with substantially equal performance characteristics in all directions, for example, such that a first end 108 of the vehicle 102 is the front end of the vehicle 102 when traveling in a first direction 110, and such that the first end 108 becomes the rear end of the vehicle 102 when traveling in the opposite, second direction 112, as shown in FIG. 1. Similarly, a second end 114 of the vehicle 102 is the front end of the vehicle 102 when traveling in the second direction 112, and such that the second end 114 becomes the rear end of the vehicle 102 when traveling in the opposite, first direction 110. These example characteristics may facilitate greater maneuverability, for example, in small spaces or crowded environments, such as parking lots and urban areas.

A vehicle such as the example vehicle 102 may travel through the environment 104 and collect data from one or more sensors 116 for generating sensor data representative of objects in the environment 104. As explained herein, the sensor data may be used for one or more of creating training data for training a segmentation model, for updating a map data store by supplementing and/or verifying map data relating to a portion of the environment 104 for which map data has already been collected and/or by adding map data to the map data store relating to portions of the environment for which map data has not been previously collected, or assisting with control of operation of a vehicle, such as the example vehicle 102. For example, the vehicle 102 may include one or more of the sensors 116 configured to capture sensor data representative of the environment 104 as the vehicle 102 travels through the environment 104. In the example shown in FIG. 1, the sensor(s) 116 and associated description are described in relation to use of one or more imagers (e.g., stereoscopic cameras, depth cameras, etc.). Although discussed in the context of one or more imagers and/or in the context of an autonomous vehicle, the methods, apparatuses, and systems described herein may be applied to a variety of systems utilizing, for example, machine vision. For example, the one or more sensors may include one or more LIDAR sensors, one or more RADAR sensors, one or more ultrasonic transducers (such as SONAR) sensors, and/or any sensor types configured to generate sensor data-sets representative of the environment. In some examples, the methods, apparatuses, and systems may be used for other purposes, for example, in a manufacturing assembly line context, or in an aerial surveying context. The datasets may include any number of layers or channels, which may correspond to any number of dimensions. In some examples, the techniques described herein may be used with actual data (e.g., captured using sensor(s)), simulated data (e.g., generated by a simulator), and/or combinations thereof.

As shown in FIG. 1, the vehicle 102 travels through the environment 104, and the one or more sensors 116 generate sensor data representative of the environment 104. For example, the one more sensors 116 may substantially continuously or intermittently generate sensor data including sensor data corresponding to one or more objects 118 in the environment 104. The example process 100, at 120, may include generating first sensor data 122 representative of one or more objects 118 in the environment 104. For example, the first sensor data 122 may include sensor data representative of one or much objects, such as, for example, vehicles 124, buildings 126, the road 128, a guardrail 130, a light pole 132, foliage 134, etc., for example, as described herein. In some examples, the one or more sensors 116 may be operating in association with a localization component and/or a perception component of the vehicle 102, for example, when the vehicle 102 is an autonomous vehicle. In some examples, the first sensor data 122 may include combined or fused data from sensor data obtained from two or more sensors and/or sensor types to create the first sensor data 122.

Figure 4:
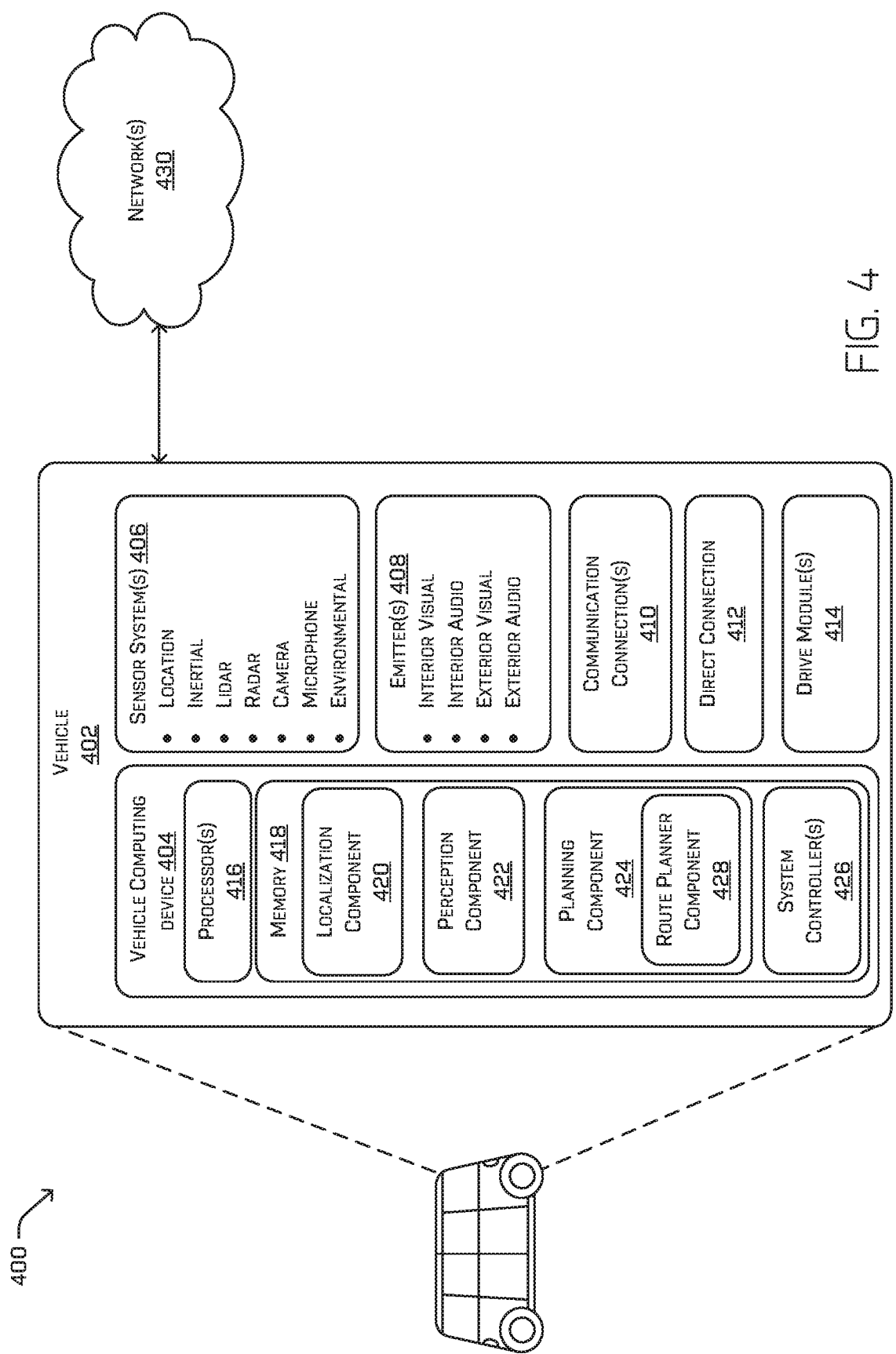
FIG. 4 is shows an example architecture for implementing one or more of the example processes described herein.

In some examples, the vehicle 102 may include a localization component, for example, as described herein with respect to FIG. 4. At 136 the process 100 may include localizing the vehicle 102 based at least in part on the first sensor data 122 to obtain a first localization 138 of the vehicle 102 including one or more of the position and/or orientation of the vehicle 102 in the environment 104.

At 140, the process 100 may include associating one or more of first features 142 from a map data store 144 with the first sensor data 122 to create first training data 146. In some examples, the map data store 144 may include a map, which in some examples, may be a local map stored onboard the vehicle 102 and/or may be an off-line global map stored at a location remote from the vehicle 102. The first features 142 may be included in map data related to portions of the environments 104 for which map data has already been obtained. In some examples, the first localization 138 may be used to identify map data in the map data store 144 that corresponds to the portion of the environment 104 associated with the first sensor data 122. For example, the first features 142 may include data related to one or more of lanes, lane markings (e.g., single and/or double, solid, and/or dashed, yellow or white lines), road markings, road indications, light poles, utility poles, bridge supports, buildings, manhole covers, curves, intersections, traffic signs, traffic signals, crosswalks, sidewalks, medians, traffic islands, or traffic circles. As shown in FIG. 1, for example, one or more lanes defined by one or more lane boundaries 148 may be included in the data associated with the first features 142 obtained from the map data store 144. Once determined, the one or more lane boundaries 148 may be projected or overlaid onto the first sensor data 122 to create the first training data 146.

At 148, the example process 100 includes communicating the first training data 146 to a segmentation model 150 configured to receive sensor data representing the environment and segment the sensor data to classify one or more features in the environment according to a plurality of classifications. In this example manner, the first training data 146 may be used to create a trained segmentation model 152 (e.g., trained relative to the segmentation model 150 prior to receiving the first training data 146). For example, prior to receiving the first training data 146, the segmentation model 150 may not have been capable of segmenting the first sensor data 122 to identify the lane boundaries 148. After receiving the first training data 146 and being trained therewith, however, the trained segmentation model 152 may be capable of identifying one or more of the lane boundaries 148. In some examples, the first training data 146 may include data associated with other features in the environment, such as, for example, curves, intersections, traffic signs, traffic signals, crosswalks, sidewalks, medians, traffic islands, or traffic circles, for example, as described previously herein. The segmentation model 150, in some examples, may be any machine learned model, such as, for example, a neural network, trained to receive sensor data representing the environment and segment the sensor data to classify one or more features in the environment according to a plurality of classifications, for example, as described herein.

The example process 100 at 154 may also include generating second sensor data 156 (e.g., via the one or more sensors 116) at a second time after a time at which the first sensor data 122 was received, with the second sensor data 156 representing a second portion of the environment 104. At 158, the process 100 may include communicating the second sensor data 156 to the trained segmentation model 152 to segment the second sensor data 156 to classify one or more features in the second portion of the environment 104 according to the plurality of classifications to create second segmented sensor data 160. In some examples, the second sensor data 156 may be representative of a portion of the environment 104 for which map data has already been stored in the map data store 144. In some examples, the second sensor data 156 may be representative of a portion of the environment 104 for which map data has not already been stored in the map data store 144. In some examples of the process 100, at 162, the second segmented sensor data 160 may be used to create further updated map data 164, which, at 166 may be communicated to the map data store 144 to further update it.

Figure 2:
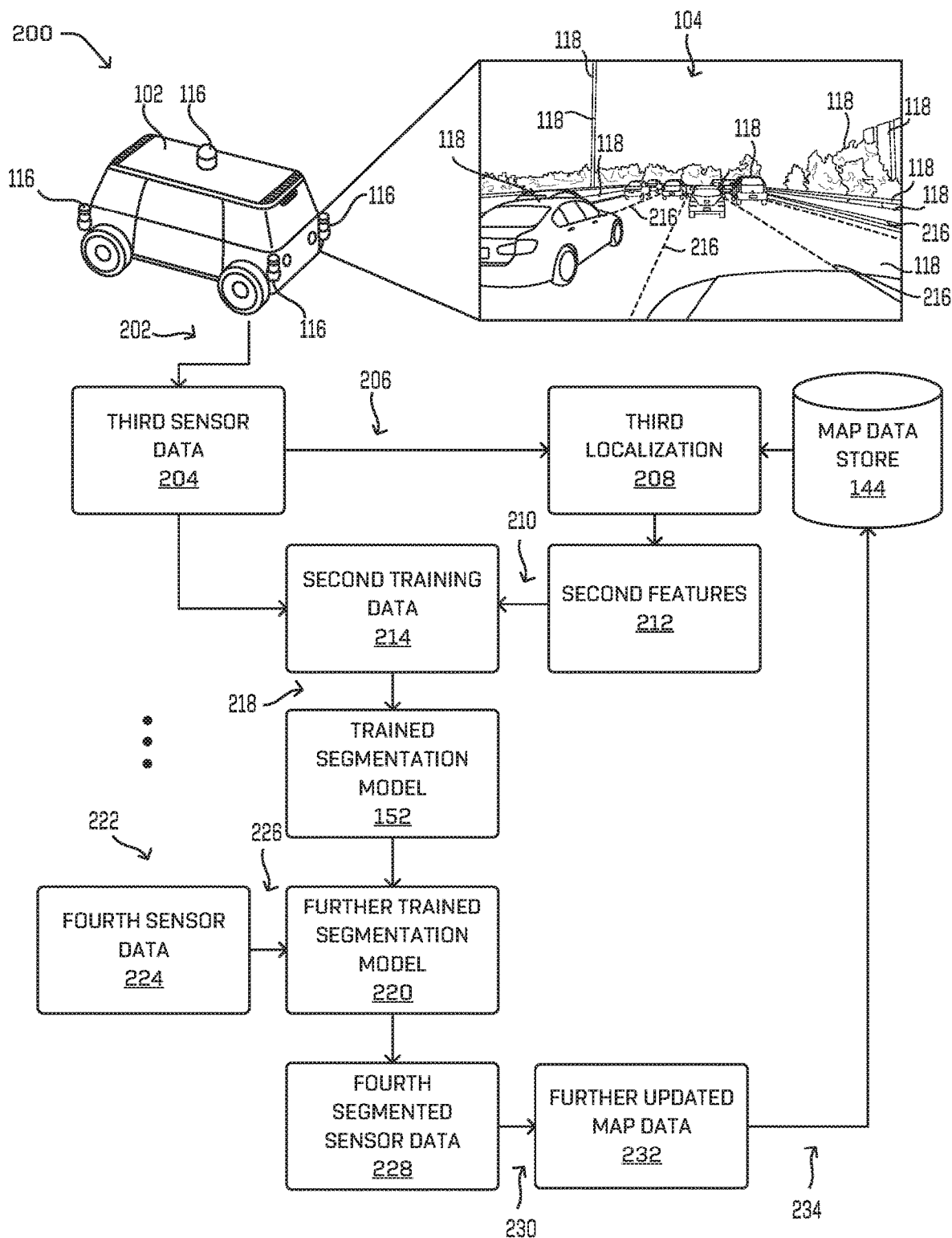
FIG. 2 is a pictorial flow diagram of an example process for creating additional training data and using the additional training data to train and use an example segmentation model.

FIG. 2 is a pictorial flow diagram of an example process 200 showing an example of how the updated map data store 144 may be further updated at least in part as a result of further training of the trained segmentation model 152. For example, additional training data may be created (e.g., automatically created), and the additional training data may be communicated to the segmentation model 150 to further train the segmentation model 150.

For example, as shown in FIG. 2, the example process 200 may include a vehicle (e.g., the example vehicle 102 shown if FIG. 1 or another vehicle) traveling through the environment 104 and collecting data from one or more sensors 116 for generating sensor data representative of objects in the environment 104. As described with respect to FIG. 1, the sensor data may be used for one or more of creating training data for training a segmentation model, for updating a map data store by supplementing and/or verifying map data relating to a portion of the environment 104 for which map data has already been collected and/or by adding map data to the map data store relating to portions of the environment for which map data has not been previously collected, or assisting with control of operation of a vehicle. The vehicle 102 may include one or more of the sensors 116 configured to capture sensor data representative of the environment 104 as the vehicle 102 travels through the environment 104.

The example process 200, at 202, may include generating third sensor data 204 representative of one or more objects 118 in the environment 104. For example, the third sensor data 204 may include sensor data representative of one or much objects, such as, for example, those objects described with respect to FIG. 1 (e.g., vehicles, buildings, the road, guardrails, light poles, foliage, etc.). In some examples, the one or more sensors 116 may be operating in association with a localization component and/or a perception component of the vehicle 102, for example. In some examples, the third sensor data 204 may include combined or fused data from sensor data obtained from two or more sensors and/or sensor types to create the third sensor data 204.

The example process 200 shown in FIG. 2, at 206, may include localizing the vehicle 102 using the localization component based at least in part on the third sensor data 204 to obtain a third localization 208 of the vehicle 102, including one or more of the position and/or orientation of the vehicle 102 in the environment 104.

At 210, the process 200 may include associating one or more of second features 212 from the map data store 144 with the third sensor data 204 to create second training data 214. For example, the second features 212 may be included in map data related to portions of the environment 104 for which map data has already been obtained. In some examples, the third localization 208 may be used to identify map data in the map data store 144 that corresponds to the portion of the environment 104 associated with the third sensor data 204. For example, the second features 212 may include data related to one or more of lanes, curves, intersections, traffic signs, traffic signals, crosswalks, sidewalks, medians, traffic islands, traffic circles, etc., for example, as previously described herein. As shown in FIG. 2, for example, one or more lanes defined by one or more lane boundaries 216 and/or other features may be included in the data associated with the second features 212 obtained from the map data store 144, and the one or more lanes boundaries 216 and/or other features may be projected or overlaid onto the third sensor data 204 to create the second training dataset 214.

At 218, the example process 200 includes communicating the second training data 214 to the trained segmentation model 152, which was trained in the example process 100 depicted in FIG. 1, to create a further trained segmentation model 220 (e.g., further trained relative to the segmentation model 150 prior to receiving the first training data 146 to create the trained segmentation model 152 shown in FIG. 1). In this example manner, the second training data 214 may be used to further train the trained segmentation model 152 shown in FIG. 1. After receiving the second training data 214 and being trained therewith, the further trained segmentation model 220 may be capable of identifying one or more additional features present in the third sensor data 204, as well as the features present in the first sensor data 122. In some examples, the second training data 214 may include data associated with features in the environment that are the same or different from those present in first training data 146, such as, for example, curves, intersections, traffic signs, traffic signals, crosswalks, sidewalks, medians, traffic islands, traffic circles, etc., for example, as previously described herein.

The example process 200 at 222 may also include generating fourth sensor data 224 (e.g., via the one or more sensors 116) at a time after a time at which the first sensor data 122, second sensor data 156, and the third sensor data 204 was received, with the fourth sensor data 224 representing a fourth portion of the environment 104. At 226, the process 200 may include communicating the fourth sensor data 224 to the further trained segmentation model 220 to segment the fourth sensor data 224 to create fourth segmented sensor data 228. In some examples, the fourth sensor data 224 may be representative of a portion of the environment 104 for which map data has already been stored in the map data store 144. In some examples, the fourth sensor data 224 may be representative of a portion of the environment 104 for which map data has not already been stored in the map data store 144. In some examples of the process 200, at 230, the fourth segmented sensor data 228 may be used to create further updated map data 232, which, at 234, may be communicated to the map data store 144 to further update it.

Figure 3:
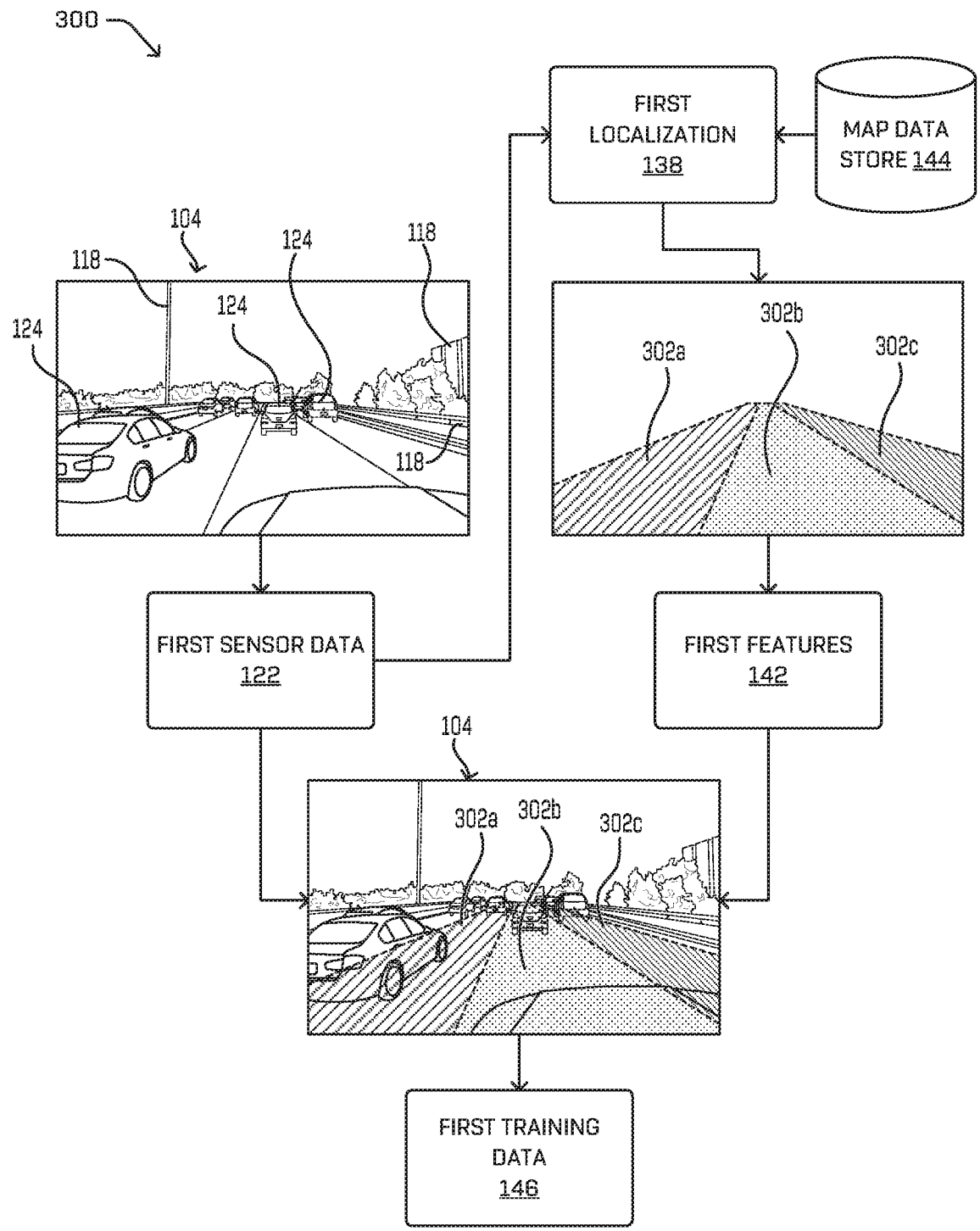
FIG. 3 is pictorial flow diagram of an example process for creating training data based at least in part on example sensor data and example features obtained from an example map data store.

FIG. 3 is pictorial flow diagram of an example process 300 for creating training data based at least in part on example sensor data and example features obtained from an example map data store. As shown in FIG. 3, a vehicle travels through the environment 104, and the one or more sensors generate first sensor data 122 representative of the environment 104, for example, as described previously herein. The first sensor data 122 may include data representative of one or more objects 118 in the environment 104, including, for example, other vehicles 124, etc., for example, as described herein. The process 300 may include localizing the vehicle based at least in part on the first sensor data 122 to obtain a first localization 138 of the vehicle 102, including one or more of the position and/or orientation of the vehicle 102 in the environment 104. The example process 300 as shown in FIG. 3 also includes associating one or more of first features 142 from a map data store 144 with the first sensor data 122 to create first training data 146. For example, as shown in FIG. 3, the map data store 144 may include a map, which in some examples, may be a local map stored onboard the vehicle 102 and/or may be an off-line global map stored at a location remote from the vehicle 102. For example, as shown in FIG. 3, the example first features 142 include data related to one or more of lanes and/or lane markings 302a, 302b, and 302c (e.g., single and/or double, solid, and/or dashed, yellow or white lines). As shown in FIG. 3, for example, the one or more of lanes and/or lane markings 302a, 302b, and 302c may be projected or overlaid onto the first sensor data 122 to create the first training data 146. In this example manner, the first training data 146 may be automatically created as the one or more sensors pass through the environment.

FIG. 4 depicts a block diagram of an example system 400 for implementing the techniques described herein. In at least one example, the system 400 may include a vehicle 402, which may be similar or generally the same type of vehicle as the example vehicle 102 described above with reference to FIGS. 1 and 2.

In some examples, the vehicle 402 may include a vehicle computing device 404, one or more sensor systems 406, one or more emitters 408, one or more communication connections 410, at least one direct connection 412, and one or more drive modules 414.

The vehicle computing device 404 may include one or more processors 416 and memory 418 communicatively coupled with the one or more processors 416. In the example shown, the vehicle 402 is an autonomous vehicle. However, the vehicle 402 could be any other type of vehicle. In the example shown, the memory 418 of the vehicle computing device 404 may be configured to store a localization component 420, a perception component 422, a planning component 424, and/or one or more system controllers 426. Though shown in FIG. 4 as residing in memory 418 for illustrative purposes, it is contemplated that the planning component 424 may additionally, or alternatively, be stored remotely and accessible to the vehicle 402.

In some examples, the localization component 420 may be configured to receive data from the sensor system(s) 406 and determine a position of the vehicle 402. For example, the localization component 420 may include a three-dimensional map of an environment and may continuously or intermittently determine a location of the autonomous vehicle within the map. In some examples, the localization component 420 may use SLAM (simultaneous localization and mapping) or CLAMS (calibration, localization and mapping, simultaneously) to receive image data, LIDAR data, RADAR data, SONAR data, IMU data, GPS data, and the like to accurately determine a location of the autonomous vehicle. In some examples, the localization component 420 may provide data to various components of the vehicle 402 to determine an initial position of an autonomous vehicle for generating candidate trajectories, for example, as described herein.

In some examples, the perception component 422 may be configured to perform object detection, segmentation, and/or classification, for example, as described herein. In some examples, the perception component 422 may provide processed sensor data that indicates the presence of an entity or object that is proximate to the vehicle 402 and/or a classification of the entity as an entity type (e.g., a car, a pedestrian, a cyclist, unknown, etc.). In additional and/or alternative examples, the perception component 422 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, etc. Characteristics associated with the environment may include, but are not limited to, a presence of another entity in the environment, a state of another entity in the environment, a time of day, a day of a week, a season, a weather condition, an indication of darkness/light, etc.

In some examples, the vehicle computing device 404 may include one or more system controllers 426, which may be configured to control steering, propulsion, braking, safety, emitters, communication, and other systems of the vehicle 402. These system controller(s) 426 may communicate with and/or control corresponding systems of the drive module(s) 414 and/or other components of the vehicle 402.

In general, the planning component 424 may include a route planner component 428. The planning component 424 may be configured to determine a path for the vehicle 402 to follow to traverse through an environment, and in some examples, the route planner component 428 may be configured to determine a most efficient route to travel from a first location (e.g., a current location) to a second location (e.g., a target location). A route may include a sequence of waypoints for travelling between two locations. As non-limiting examples, waypoints may include streets, intersections, global positioning system (GPS) coordinates, etc. In some examples, the route planner component 428 may perform a search, such as a graph search, on top of a map to identify a route to guide the autonomous vehicle from a first location to a second location. A map may be any number of data structures modeled in two dimensions or three dimensions that are capable of providing information about an environment, such as, but not limited to, topologies (such as intersections), streets, mountain ranges, roads, terrain, and the environment in general.

In some examples, the route planner component 428 may identify two or more candidate routes for guiding the autonomous vehicle from the first location to the second location. In some such examples, the route planner component 428 may rank the two or more candidate routes based on route planning constraint(s). Route planning constraint(s) may include rules of the road, travel time, travel distance, etc. In some examples, the route planner component 428 may determine that a top-ranking candidate route is the route for guiding the autonomous vehicle from the first location to the second location.

The route planner component 428 may output a sequence of waypoints corresponding to the route. In general, and in some examples, the route (e.g., the sequence of waypoints) may be used to generate an instruction for guiding the autonomous vehicle along at least a portion of the route from the first location to the second location. In some examples, the autonomous vehicle may be guided from a first waypoint in the sequence of waypoints to a second waypoint in the sequence of waypoints. In some examples, the instruction may be a trajectory or a portion of a trajectory. In some such examples, a sequence of actions may be generated (e.g., maneuvering down the road, accelerating, changing lanes, turning left, etc.) to guide the autonomous vehicle along the route. In some examples, the instruction may include a policy, which may be used to determine a trajectory of the autonomous vehicle based on real-time processed sensor data received from sensor(s) on the autonomous vehicle.

In some examples, aspects of some or all of the components discussed herein may include any models, algorithms, and/or machine learning algorithms. For example, in some instances, the components in the memory 418 may be implemented as a neural network.

An example neural network may include a biologically inspired algorithm, which passes input data through a series of connected layers to produce an output. Each layer in a neural network may also include another neural network, or may include any number of layers (whether convolutional or not). As may be understood in the context of this disclosure, a neural network may use machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decision tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks, such as ResNet50, ResNet101, VGG, DenseNet, and the like.

In some examples, more than one type of machine learning may be used to provide respective results for each of the types of machine learning used. In some examples, a confidence score may be associated with each of the results, and the result relied on may be based at least in part on the confidence score associated with the result. For example, the result associated with the highest confidence score may be selected over other results, or the results may be combined based on the confidence scores, for example, based on statistical methods, such as weighted averages, etc.

In some examples, the sensor system(s) 406 may include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), imagers or cameras (e.g., RGB, IR, intensity, depth, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. In some examples, the imagers or cameras may include multiple cameras disposed at various locations about the exterior and/or interior of the vehicle 402. The sensor system(s) 406 may provide input to the vehicle computing device 404. Additionally and/or alternatively, the sensor system(s) 406 may communicate sensor data, via the one or more network(s) 430 to the one or more server computing device(s) at a particular frequency, after a lapse of a predetermined period of time, in near real-time, etc.

The vehicle 402 may also include one or more emitters 408 for emitting light and/or sound, as described above. The emitters 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408, for example, may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive module(s) 414. Also, the communication connection(s) 410 may allow the vehicle 402 to communicate with other nearby computing device(s) (e.g., other nearby vehicles, traffic signals, etc.). The communications connection(s) 410 may also enable the vehicle 402 to communicate with a remote teleoperations computing device or other remote services and or a map data store, such as, for example, the map store 148 described with respect to FIGS. 1 and 2, which may be located remotely from the vehicle 402.

The communications connection(s) 410 may include physical and/or logical interfaces for connecting the vehicle computing device 404 to another computing device or a network, such as network(s) 430. For example, the communications connection(s) 410 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some examples, the vehicle 402 may include one or more drive modules 414. In some examples, the vehicle 402 may have a single drive module 414. For example, the vehicle 402 may include multiple drive modules 414, and individual drive modules 414 may be positioned on opposite ends of the vehicle 402 (e.g., the front and the rear, etc.). In some examples, the drive module(s) 414 may include one or more sensor systems configured to detect conditions of the drive module(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, SONAR sensors, etc. Some sensors, such as the wheel encoders, may be unique to the drive module(s) 414. In some examples, the sensor system(s) on the drive module(s) 414 may overlap or supplement corresponding systems of the vehicle 402 (e.g., sensor system(s) 406).

The drive module(s) 414 may include many of the vehicle systems, including a high voltage battery, a motor configured to propel the vehicle, an inverter configured to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., a cooling system, safety systems, an onboard charging system, other electrical components, such as a DC/DC converter, a high voltage junction, a high voltage cable, charging system, charge port, etc.). Additionally, the drive module(s) 414 may include a drive module controller, which may be configured to receive and preprocess data from the sensor system(s), and which may control operation of the various vehicle systems. In some examples, the drive module controller may include one or more processors and memory communicatively coupled with the one or more processors. The memory may store one or more modules to perform various functionalities of the drive module(s) 414. Furthermore, the drive module(s) 414 may also include one or more communication connection(s) that enable communication by the respective drive module with one or more other local or remote computing device(s).

The processor(s) 416 of the vehicle 402 may include any suitable processors capable of executing instructions to process data and perform operations, as described herein. By way of example and not limitation, the processor(s) 416 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 418 is an example of non-transitory computer-readable media. The memory 418 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with remote computing devices accessible via the network(s) 430.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 400 (see FIG. 4) is merely illustrative and is not intended to limit the scope of the present disclosure. In particular, the computing system and devices may include any combination of hardware or software that may perform the indicated functions, including computers, network devices, internet appliances, tablet computers, PDAs, wireless phones, pagers, etc. The architecture 400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 400. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 400 may be transmitted to the architecture 400 via transmission media or signals, such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations.

Figure 5:
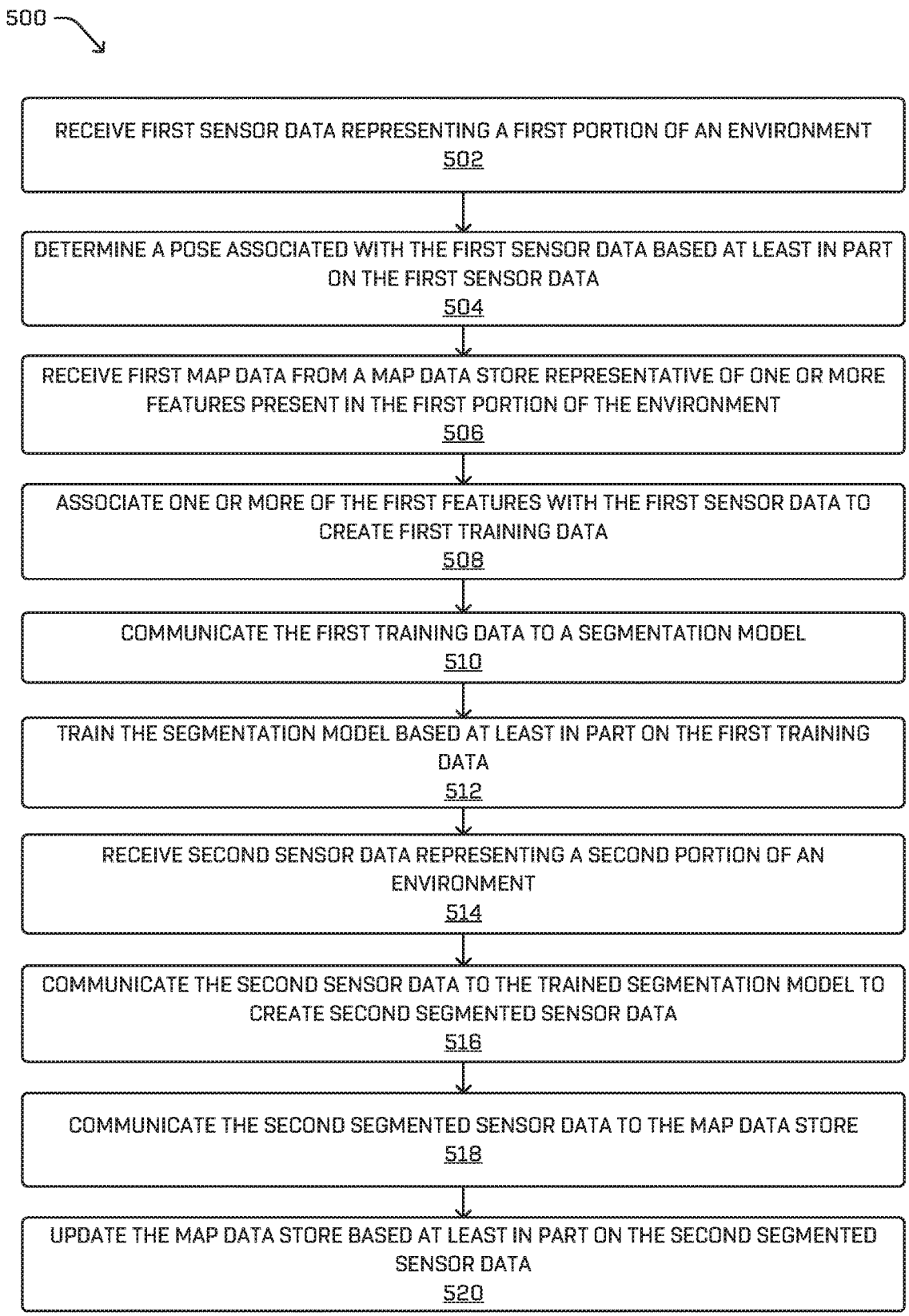
FIG. 5 is a flow diagram of an example process for creating training data, training a segmentation model using the created training data, and updating a map data store.

FIGS. 5 and 6 are flow diagrams of example processes illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes.

FIG. 5 is a flow diagram of an example process 500 for creating training datasets (e.g., automatically creating training datasets) for use in training segmentation models configured to receive sensor data representing the environment and segment the sensor data to classify one or more features in the environment according to a plurality of classifications. At 502, the example process 500 may include receiving first sensor data representing a first portion of an environment. For example, as a vehicle travels through the environment, one or more sensors coupled to the vehicle may generate sensor data representative of objects in the environment, such as, for example, the sensors described herein. At 504, the process 500 may include determining a pose (e.g., a global or local pose) associated with the first sensor data based at least in part on the first sensor data. For example, the first sensor data may be received by a localization component, such as the example localization component described herein with respect to FIG. 4, and the localization component may determine a pose (e.g., a global or local pose) associated with the first sensor data. In some examples, this may include determining the pose of a vehicle to which the one or more sensors are coupled.

The example process 500, at 506, may include receiving first map data from a map data store representative of one or more first features present in the first portion of the environment. For example, based at least in part on the first sensor data and/or the pose associated with the first sensor data, map data related to the first portion of the environment through which the one or more sensors (e.g., and vehicle) is/are traveling may be identified, and features of the first portion of the environment may be received by the system from the map data store. For example, the first features may include lanes, lane markings (e.g., single or double, solid or dashed, and/or yellow or white lines), road markings, road indications, light poles, utility poles, bridge supports, buildings, manhole covers, curves, intersections, traffic signs, traffic signals, crosswalks, sidewalks, medians, traffic islands, or traffic circles. Other features are contemplated. In some examples, the map data store may be an off-line map data store, for example, located remotely from the system (e.g., remotely from the vehicle), and the map data may be communicated to the system via a communication network, for example, as described herein with respect to FIG. 4.

At 508, the example process 500 may include associating one or more of the first features with the first sensor data to create first training data. For example, the first features may be projected onto or overlaid onto the first sensor data, so that the first features may be correlated to the first sensor data. In some examples, the correlations may be included in a training dataset that may be used to train a segmentation model, so that the trained segmentation model may be used to segment and/or classify sensor data associated with the same or similar features present in other sensor data. In some examples, the segmentation model may be a neural network configured (e.g., trained) to segment and/or classify data included in sensor data. In various examples, the raw sensor data (obtained in 502) may be input in the neural network, and sensor data having overlaid map data (obtained in 508) may be used as a "ground truth" output to train the neural network.

The process 500 according to some examples may include, at 510, communicating the first training data to a segmentation model configured to receive sensor data representing an environment and segment the sensor data to classify one or more features in the sensor data. At 512, the example process 500 may include training the segmentation model based at least in part on the first training data.

In some examples, the process 500, at 514, may include receiving second sensor data representing a second portion of an environment. The second sensor data may be received from one or more sensors configured generate sensor data representative of objects in the environment, for example, such as the sensors described herein. The example process 500 may include, at 516, communicating the second sensor data to the trained segmentation model to create second segmented sensor data (e.g., automatically creating second segmented sensor data). At 518, the example process 500 may include communicating the second segmented sensor data to the map data store, and in some examples, the process 500 may include at 520 updating the map data store based at least in part on the second segmented sensor data.

In some examples, the process 500 may also include determining one or more of a position or an orientation of a vehicle or other device associated with one or more sensors based at least in part on updated map data from the updated map data store. In some such examples, the process 500 may include generating, based on the one or more of the position or the orientation of the vehicle, one or more trajectories for maneuvering the vehicle, and in some examples, maneuvering the vehicle based at least in part on the one or more trajectories.

FIG. 6 is a flow diagram of an example process 600 process for creating additional training data, training a segmentation model using the created additional training data, and using segmented data to determine a vehicle pose, generate trajectories, and maneuver the vehicle based at least in part on one or more of the trajectories. At least portions of the example process 500 may be combined with at least portions of the example process 600.

At 602, the example process 600 may include receiving third sensor data representing a third portion of an environment. The third sensor data may be received from one or more sensors configured to generate sensor data representative of objects in the environment, for example, such as the sensors described herein. The example process 600, at 604, may include receiving third map data from the updated map data store. In some examples, the third map data may correspond to the third portion of the environment and may include data representative of one or more features present in the third portion of the environment. At 606, the example process 600 may include associating one or more of the features with the third sensor data to create second training data, for example, as described above with respect to the example process 500. At 608, the example process 600 may also include communicating the second training data to the trained segmentation model, and, at 610, may include further training the trained segmentation model based at least in part on the second training data. This may be performed in a manner, for example, at least similar to the manner described with respect to the example process 500.

At 612, the process 600 may include determining one or more of a position or an orientation of a vehicle based at least in part on updated map data from the updated map data store. In some such examples, the process 600 may include, at 614, generating, based at least in part on the one or more of the position or the orientation of the vehicle, one or more trajectories for maneuvering the vehicle. For example, the system may include a planning component and a route planner component, such as those described herein with respect to FIG. 4, and the planning component and the route planner component may generate one or more trajectories for maneuvering the vehicle based at least in part on the pose of the system (e.g., a vehicle including the system). In some such examples, the process 600, at 616, may also include maneuvering the vehicle based at least in part on the one or more trajectories. In some examples, one or more system controllers may cause one or more of the drive modules, for example, such as those described herein, to cause the vehicle to maneuver based at least in part on the one or more trajectories.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A system comprising:
one or more processors; and
one or more computer readable storage media communicatively coupled to the one or more processors and storing instructions that are executable by the one or more processors to:
receive first sensor data representing a first portion of an environment;

receive first map data corresponding to the first portion of the environment and comprising data representative of one or more first features present in the first portion of the environment;

associate one or more of the first features of the first map data with the first sensor data to create first training dataset;

communicate the first training dataset to a segmentation model configured to receive sensor data representing the environment and segment the sensor data based at least in part on the one or more of the first features in the environment; and train the segmentation model based at least in part on using the first training dataset as ground truth to create a trained segmentation model.

2. The system of claim 1, wherein the instructions are further executable by the one or more processors to:

determine a pose associated with the first sensor data; and determine the first map data that corresponds to the first portion of the environment based at least in part on the pose associated with the first sensor data.

3. The system of claim 1, wherein the instructions are further executable by the one or more processors to:

receive second sensor data representing a second portion of the environment;

communicate the second sensor data to the trained segmentation model to segment the second sensor data based at least in part on one or more second features in the second portion of the environment to create segmented second sensor data;

communicate the segmented second sensor data to a map data store; and update the map data store to create an updated map store based at least in part on the segmented second sensor data.

4. The system of claim 1, wherein:

the first sensor data comprises sensor data related to lanes of a road;

the first map data corresponding to the first portion of the environment comprises data representative of lanes of a road present in the first portion of the environment; and associating one or more of the first features of the first map data with the first sensor data to create the first training dataset comprises associating one or more of the lanes of the road with the first sensor data to create the first training dataset.

5. A method comprising:

receiving first sensor data representing a first portion of an environment;

receiving first map data corresponding to the first portion of the environment and comprising data representative of one or more first features present in the first portion of the environment;

associating one or more of the first features of the first map data with the first sensor data to create first training dataset;

communicating the first training dataset to a segmentation model configured to receive sensor data representing the environment and segment the first sensor data to create segmented first sensor data based at least in part on the one or more first features in the environment; and training the segmentation model based at least in part on using the first training dataset as ground truth to create a trained segmentation model.

6. The method of claim 5, further comprising:

determining, based at least in part on the segmented first sensor data, a pose associated with the first sensor data; and determining the first map data that corresponds to the first portion of the environment based at least in part on the pose associated with the first sensor data.

7. The method of claim 5, further comprising:

receiving second sensor data representing a second portion of the environment; and communicating the second sensor data to the trained segmentation model to segment the second sensor data based at least in part on one or more second features in the second portion of the environment to create segmented second sensor data.

8. The method of claim 7, further comprising:

communicating the segmented second sensor data to a map data store; and updating the map data store to create an updated map data store based at least in part on the segmented second sensor data.

9. The method of claim 8, further comprising:

receiving third sensor data representing a third portion of the environment;

receiving third map data from the updated map data store, the third map data corresponding to the third portion of the environment and comprising data representative of one or more third features present in the third portion of the environment;

associating one or more of the third features with the third sensor data to create second training data;

communicating the second training dataset to the trained segmentation model; and further training the trained segmentation model based at least in part on the second training dataset.

10. The method of claim 5, wherein receiving the first sensor data comprises receiving the first sensor data from one or more of one or more imagers, one or more light detection and ranging (LIDAR) sensors, one or more radio detection and ranging (RADAR) sensors, or one or more sound navigation and ranging (SONAR) sensors.

11. The method of claim 5, wherein the data representative of one or more features present in the first portion of the environment comprises data representative of one or more of road features comprising one or more of lanes, lane markings, road markings, road indications, light poles, utility poles, bridge supports, buildings, manhole covers, curves, intersections, traffic signs, traffic signals, crosswalks, sidewalks, medians, traffic islands, or traffic circles.

12. The method of claim 5, wherein the segmentation model comprises a neural network, wherein associating one or more of the first features of the first map data with the first sensor data comprises projecting the one or more first features of the first map data into the first sensor data, and wherein training the segmentation model comprises providing the first sensor data as input to the segmentation model and utilizing the first training dataset as an expected ground truth output.

13. The method of claim 8, further comprising communicating updated map data from the updated map data store to a vehicle, such that:

one or more of a position or an orientation of the vehicle are determined based on the updated map data;

one or more trajectories for maneuvering the vehicle are determined based at least in part on one or more of the position or the orientation of the vehicle; and the vehicle is maneuvered based at least in part on the one or more trajectories.

14. A non-transitory computer-readable storage medium having computer-executable instructions stored thereupon which, when executed by a computer, cause the computer to:
receive first sensor data representing a first portion of an environment;
receive first map data corresponding to the first portion of the environment and comprising data representative of one or more first features present in the first portion of the environment;
associate one or more of the first features of the first map data with the first sensor data to create first training dataset;
communicate the first training dataset to a segmentation model configured to receive sensor data representing the environment and segment the sensor data based at least in part on one or more features in the environment; and
train the segmentation model based at least in part on using the first training dataset as ground truth to create a trained segmentation model.

15. The non-transitory computer-readable storage medium of claim 14, further cause the computer to:
determine a pose associated with the first sensor data; and
determine the first map data that corresponds to the first portion of the environment based at least in part on the pose associated with the first sensor data.

16. The non-transitory computer-readable storage medium of claim 14, further cause the computer to:
receive second sensor data representing a second portion of the environment;
communicate the second sensor data to the trained segmentation model to segment the second sensor data based at least in part on one or more second features in the second portion of the environment according to a plurality of classifications to create segmented second sensor data.

17. The non-transitory computer-readable storage medium of claim 16, further cause the computer to:
communicate the segmented second sensor data to a map data store; and
update the map data store to create an updated map data store based at least in part on the segmented second sensor data.

18. The non-transitory computer-readable storage medium of claim 14, wherein:
the first sensor data comprises sensor data related to lanes of a road;
the first map data corresponding to the first portion of the environment comprises data representative of lanes of a road present in the first portion of the environment; and
associating one or more of the first features of the first map data with the first sensor data to create the first training dataset comprises projecting one or more of the lanes of the road into the first sensor data to create the first training dataset.

19. The non-transitory computer-readable storage medium of claim 14, wherein the first sensor data comprises sensor data received from one or more of one or more imagers, one or more light detection and ranging (LIDAR) sensors, one or more radio detection and ranging (RADAR) sensors, or one or more sound navigation and ranging (SONAR) sensors.

20. The non-transitory computer-readable storage medium of claim 17, further cause the computer to communicate updated map data from the updated map data store to a vehicle, such that:
one or more of a position or an orientation of the vehicle are determined;
one or more trajectories for maneuvering the vehicle are determined based at least in part on one or more of the position or the orientation of the vehicle; and
the vehicle is maneuvered based at least in part on the one or more trajectories.

* * * * *